(12) United States Patent
Qureshi

(10) Patent No.: US 7,953,900 B2
(45) Date of Patent: May 31, 2011

(54) SYSTEM AND METHOD FOR DISCOVERING I/O BUS CAPABILITIES ON A COMPUTER SYSTEM VIA ACPI

(75) Inventor: Shiraz A. Qureshi, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 736 days.

(21) Appl. No.: 10/969,756

(22) Filed: Oct. 19, 2004

(65) Prior Publication Data
US 2005/0091433 A1    Apr. 28, 2005

Related U.S. Application Data

(60) Provisional application No. 60/513,781, filed on Oct. 22, 2003.

(51) Int. Cl.
*G06F 3/00* (2006.01)
*G06F 13/14* (2006.01)
*G06F 9/00* (2006.01)
*G06F 1/00* (2006.01)

(52) U.S. Cl. .............. 710/8; 710/10; 710/16; 710/17; 710/305; 713/1; 713/300

(58) Field of Classification Search .............. 710/8–14; 713/1–2
See application file for complete search history.

(56) References Cited

U.S. PATENT DOCUMENTS

| | | | |
|---|---|---|---|
| 6,792,520 B2 * | 9/2004 | Qureshi et al. | 710/8 |
| 6,877,018 B2 * | 4/2005 | Oshins et al. | 707/206 |
| 6,976,119 B2 * | 12/2005 | Qureshi et al. | 713/1 |
| 7,069,360 B2 * | 6/2006 | Thurlo et al. | 710/16 |
| 7,114,064 B2 * | 9/2006 | Ramesh et al. | 713/1 |

* cited by examiner

*Primary Examiner* — Alan Chen

(57) ABSTRACT

A system and method for discovering I/O bus capabilities. Specifically, a system is described for discovering I/O bus capabilities on a computer system. The system includes an ACPI name space, a first ACPI interface, and a second ACPI interface. The ACPI name space details hardware configuration in the computer system. The first ACPI interface in the ACPI name space details current capabilities of an I/O bus that is communicatively coupled to an I/O slot. The second ACPI interface details a list of all the capabilities of the I/O bus that supports the I/O slot.

25 Claims, 4 Drawing Sheets

SYSTEM AND METHOD FOR DISCOVERING I/O BUS CAPABILITIES ON A COMPUTER SYSTEM VIA ACPI

RELATED U.S. APPLICATION

This application claims priority to the provisional patent application, Ser. No. 60/513,781, entitled "Mechanism for Communicating Different Bus Types to the Operating System and Utilities Via ACPI," with filing date Oct. 22, 2003, and assigned to the assignee of the present invention, which is herein incorporated by reference in its entirety.

TECHNICAL FIELD

The present invention relates to the field of configuration management of hardware resource in computer systems, and more particularly to a system and method for discovering input/output (I/O) bus capabilities on a computer system via ACPI.

BACKGROUND ART

The Advanced Configuration and Power Interface (ACPI) specification was developed to establish an industry common interface enabling robust operating system (OS) directed motherboard device configuration and power management of both devices and entire systems. ACPI is a key element in OS and utility application directed configuration and power management.

ACPI is the primary mechanism for providing system configuration information. Configuration information is important for utilities that display system information, OS utilities that decide the most efficient resource allocation for the I/O subsystem, HOT-Plug-X (peripheral component interface, version X), etc.

Previous systems and method of configuration management tools were unable to satisfactorily provide for discovering I/O bus capabilities of a computer system in order to provide for efficient allocation of resources when performing configuration management.

SUMMARY

A system and method for discovering I/O bus capabilities. Specifically, a system is described for discovering I/O bus capabilities on a computer system. The system includes an ACPI name space, a first ACPI interface, and a second ACPI interface. The ACPI name space details hardware configuration in the computer system. The first ACPI interface in the ACPI name space details current capabilities of an I/O bus that is communicatively coupled to an I/O slot. The second ACPI interface details a list of all the capabilities of the I/O bus that supports the I/O slot.

BEST MODES FOR CARRYING OUT THE INVENTION

Figure 1:
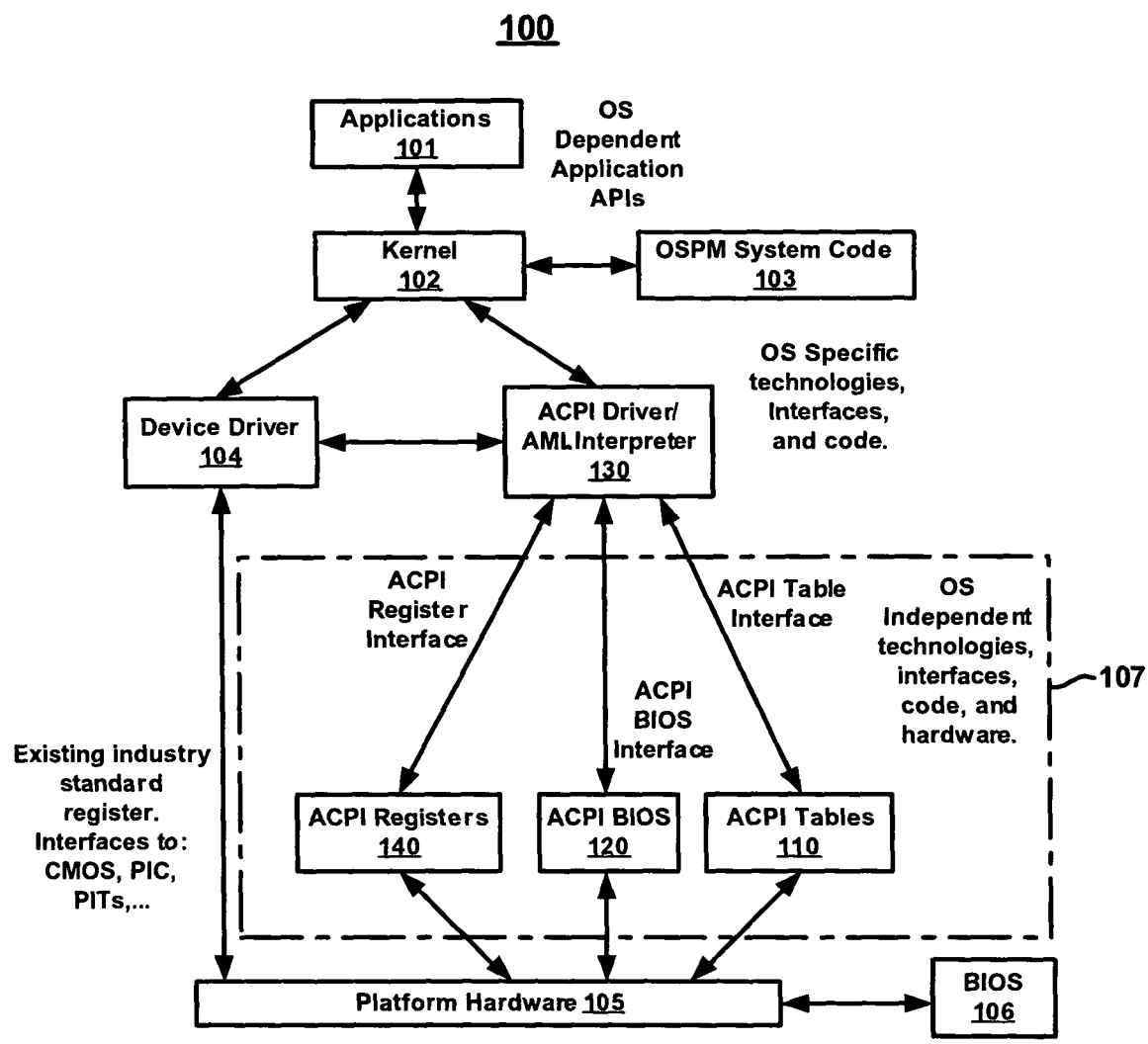
FIG. 1 is a block diagram of a system that is capable of providing bus capabilities information for an I/O bus in a computer system via ACPI, in accordance with one embodiment of the present invention.

Reference will now be made in detail to the preferred embodiments of the present invention, a system and method of discovering input/output (I/O) bus capabilities in a computer system via Advanced Configuration and Power Interface (ACPI). While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention are implemented on software running on a computer system. For instance, the computer system is a personal computer, notebook computer, server computer, mainframe, networked computer, handheld computer, personal digital assistant, workstation, mobile phone, and the like. This software program is operable for providing bus capabilities of an I/O bus in a computer system via ACPI. In one embodiment, the computer system includes a processor coupled to a bus and memory storage coupled to the bus. The memory storage can be volatile or non-volatile and can include removable storage media. The computer can also include a monitor, provision for data input and output, etc.

ACPI is the primary mechanism for providing system configuration information. However, even the latest ACPI specification (e.g., version 2.0c) does not provide the necessary interfaces for delivering information about the capabilities of an input/output (I/O) bus that is communicatively coupled to a given I/O slot. That is, there are no interfaces that provide means for discovering characteristics of each of the I/O buses used internally within a computer system. More particularly, there are no interfaces that provide bus capability information that is current. For instance, SMBIOS has a type 9 entry reporting slot information that provides bus capability information. However, this information is static to boot time with no updating to account for various resource configurations on a particular computer system. Hardware configuration is constantly changing from its state upon boot up of the computer system, which affects configuration management. Current bus capability information would be desirable for OS and utility applications performing configuration management to ensure efficient use of the I/O subsystem.

As an example, in a computer system implementing conventional techniques for configuration management, potential problems may exist when plugging in a device (e.g., I/O card) into an I/O slot that cannot support that device. For instance, an I/O bus may support two I/O slots, however the I/O bus can only operate at one frequency. Currently, the I/O bus is forced to operate at 66 MHz because another device coupled to the I/O bus through one of the I/O slots operates at 66 MHz. Because conventional techniques cannot discover the current capabilities of the I/O bus, if a device that operates at a slower frequency (e.g., 33 MHz) is coupled to the other I/O slot supported by the I/O bus, the I/O bus would crash resulting in a potential crash of the computer system. This would be the case even though the I/O bus could operate at slower speeds to accommodate the device operating at 33 MHz.

Accordingly, the present invention provides a method and system for discovering bus capabilities of I/O buses in a computer system via ACPI. In particular, embodiments of the present invention are capable of discovering current bus capabilities of an I/O bus in a computer system. As a result, because embodiments of the present invention are able to discover bus capabilities of an I/O bus dynamically there is a more efficient allocation of resources when performing configuration management.

ACPI Specification

ACPI was developed to provide an open specification linking hardware and software components through ACPI interfaces. A primary goal of ACPI is to provide power and configuration management of resources in a computer system. FIG. 1 is a block diagram of the software and hardware components relevant to ACPI and their interrelation within a computer system 100, in accordance with one embodiment of the present invention. Computer includes components, such as applications typically shown as 101, kernel 102, Operating System Power Management (OSPM) code 103, device drivers typically shown as 104, platform hardware 105, and system BIOS 106, which are separate from the ACPI system 107. ACPI System 107 is capable of discovering bus capabilities of an I/O bus via ACPI.

Three types of components are defined within the ACPI subsystem 107. These are the ACPI tables 110, the ACPI basic input/output system (BIOS) 120, and the ACPI registers 140.

The ACPI tables 110 describe the interfaces to the hardware implemented on the computer system 100. In particular, the ACPI tables 110 are the central data structure of an ACPI system. Also, in one embodiment, access within the ACPI system 107 is based on an object oriented system. The ACPI tables 110 contain definition blocks that describe the hardware that are managed through ACPI. These definition blocks contain both data objects and control methods that are used to perform hardware management operations, such as discovering I/O bus capabilities.

The definition blocks within the ACPI tables 110 define a single hierarchical tree-based name spaces (e.g., an ACPI name space). The ACPI name space provides a logical layout of the hardware components in the computer system 100. Objects within the ACPI name space contain code or data that are used to perform resource configuration management.

The ACPI BIOS 120 is a small BIOS that performs basic low-level management operations on the hardware. These operations include code to help boot the computer system 100 and put the to sleep or wake it up.

The ACPI registers 140 are a set of hardware management registers defined by the ACPI specification. The address of these registers are defined through definition blocks in the ACPI tables 110.

An ACPI driver/AML interpreter 130 provides the interface from components in the computer to the ACPI subsystem 107. The ACPI driver/AML interpreter 130 translates human oriented code to ACPI Control Method Machine Language (AML). AML is an objet oriented machine language understood by the ACPI driver/AML interpreter 130 (a virtual machine) that supports ACPI functions. Except for the operations performed by the ACPI BIOS 120, the bulk of ACPI operations are performed by interpreting AML code that are stored in the ACPI tables 110 as objects. In particular, the objects that perform code in the ACPI tables 110 are called control methods. For instance, a control method provides the current capabilities of an I/O bus in the computer system 100, in one embodiment of the present invention. That is, the control method interrogates or adjusts the system level hardware state. Additionally, the objects in the ACPI tables 110 also contain data, or constants.

System and Method for Providing Bus Capabilities Using ACPI

Figure 2A:
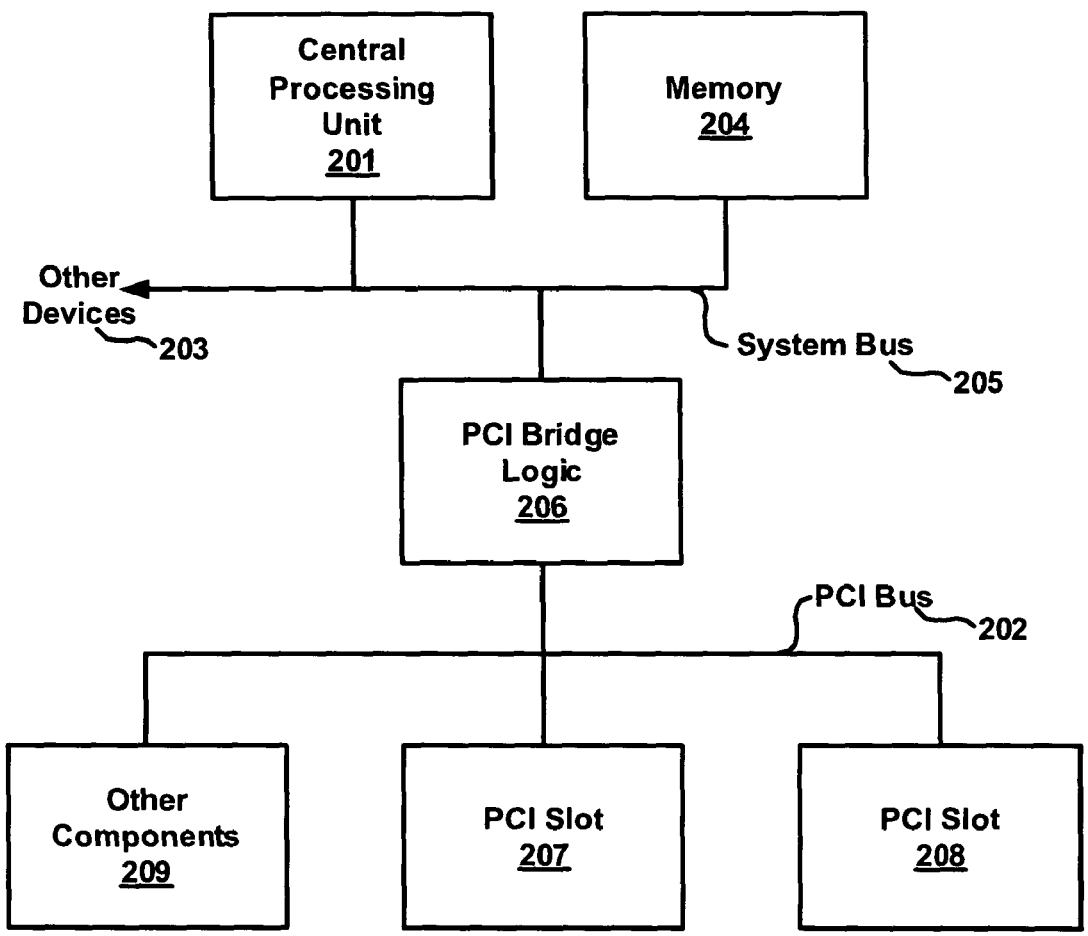
FIG. 2A is a block diagram of an exemplary computer system upon which bus capabilities of an internal I/O bus are dynamically discovered, in accordance with one embodiment of the present invention.
Figure 2B:
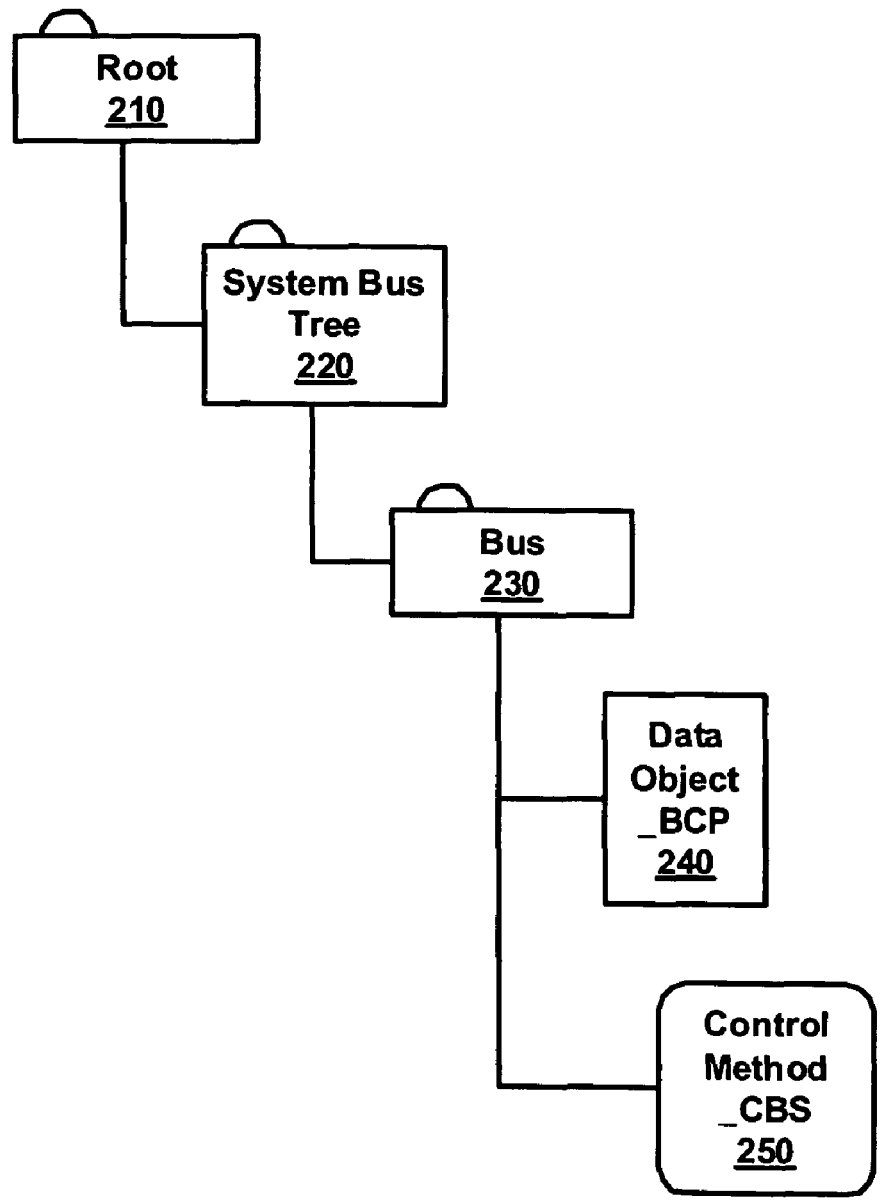
FIG. 2B is a diagram of an ACPI name space, in accordance with one embodiment of the present invention.

FIG. 2A and FIG. 2B provide an illustration of an exemplary computer system that are described in an ACPI name space. Embodiments of the present invention are implemented to discover bus capabilities of I/O buses in the computer system of FIGS. 2A and 2B.

As shown, FIG. 2A is a block diagram of a computer system 200A. The computer system 200A includes a central processing unit (CPU) communicatively coupled to main memory 204 via a system bus 205. The system bus 205, also known as the host bus, directly couples the CPU 201 also to other devices 203 within the computer system 200A. PCI bridge logic 206 interfaces the PCI bus 202 with the system bus 205. The PCI bus 202 supports the PCI slot 207 and PCI slot 208, as well as other components 209. The advantage is that the PCI bus 202 is independent of the system bus 205. To interface another bus in the computer system 200A requires another bus bridge logic block. As discussed, although embodiments of the present invention show one PCI bus 202, other embodiments of the present invention are well suited to multiple buses of various types, such as PCI-X, PCI Express, AGP, etc.

FIG. 2B is an exemplary diagram of an ACPI name space 200B, in accordance with one embodiment of the present invention. The ACPI name space 200B is included within a system that is capable of discovering bus capabilities of an I/O bus of a computer system via ACPI. The ACPI name space 200B defines the hardware configuration of the computer system 200A of FIG. 2, for instance. For purposes of clarity and illustration, name space 200B illustrates only a part of a typical name space. Objects within the name space 200B are accessed by providing the proper path to the object through the name space 200B.

The name space 200B includes a root 210. Under the root, there is a system bus tree 220 that lists all of the buses for the root 210. For purposes of clarity and illustration, only one bus 230 (e.g., the PCI bus 202 of FIG. 2A) is shown, although embodiments of the present invention are capable of supporting more than one bus. As discussed, under the system bus tree 220, a bus 230 is shown. Bus 230 is shown as an object under the system bus tree 220 in the ACPI name space 200B. For instance, bus 230 could be any bus, such as PCI, PCI-X, PCI Express, AGP, etc.

In addition, two objects are shown under the bus 230, in accordance with embodiments of the present invention. Object 250 is a first ACPI interface in the ACPI name space that details current capabilities of an I/O bus communicatively coupled to an I/O slot. Object 240 is a second ACPI interface in the ACPI name space that details a list of all the capabilities of the I/O bus that supports the I/O slot. These two ACPI interfaces provide the necessary mechanisms for describing the capabilities of a given I/O bus when called using ACPI.

In another embodiment, objects 240 and 250 could be placed under a new level of hierarchy. For example, in the ACPI name space, objects 240 and 250 could be children of a new object SxF0, wherein object SxF0 is a child of bus object 230.

Object 240 returns in ACPI a list of all the bus capabilities for a given I/O bus. A given I/O bus supports multiple bus types. For instance a PCI-X bus is capable of supporting both PCI bus capabilities as well as PCI-X bus capabilities. In one exemplary embodiment, object 240 is named _BCP (bus capabilities). The present invention is not limited to naming object 240 to _BCP, but can support any naming scheme. A call to _BCP will return a list of all the bus capabilities supported by the given I/O bus. In one embodiment, bus capabilities are presented according to bus type in a bus capabilities structure, as described below. As such, a call to _BCP will return at least one bus capabilities structure. Although the object 240 is shown as a data object (one or more constant values) in the present embodiment, other embodiments are well suited to object 240 as a control method.

Object 250 returns in ACPI the current capabilities of a given I/O bus. While an I/O bus may support many bus types, and variations within a given bus type (e.g., various frequencies), the I/O bus operates under one set of attributes or capabilities, for instance, the current capabilities. For instance, an I/O bus supports a frequency of 66 MHz, but is currently operating at 33 MHz. In one exemplary embodiment, object 250 is named _CBS (current bus capabilities). The present invention is not limited to naming object 250 to _CBS, but can support any naming scheme. In one embodiment, a call to _CBS under ACPI will return a bus capabilities structure, as described below. Although the object 250 is shown as a control method (e.g., a function call), other embodiments are well suited to object 250 as a data object.

Table 1 returns an exemplary definition of the ACPI Buffer type that is returned with a _BCP or _CBS call. Table 1 is shown for illustration purposes only and can be modified to accommodate other layouts. For example, another possible layout for the _BCP or _BCP return buffer expands the version field from a byte length of 2 bytes to 4 bytes to accommodate additional information within the version field.

TABLE 1

_BCP or _BCP Return Buffer

| Field | Byte Length | Byte Offset | Value | Description |
|---|---|---|---|---|
| Version | 2 | 0 | 1 | Version of the return buffer |
| Status | 2 | 2 | Zero or Ones | Status return of this method: Zero indicates success, Ones indicate failure. |
| Length | 4 | 4 | Computed | The length of the entire buffer, in bytes, including the version, starting from offset 0. This field is used to record the size of the entire buffer. |
| Bus Capabilities Structure [n] | — | 8 | Computed | List of capabilities of the bus/slot as defined in the Bus Capabilities Structure Definitions |

In one embodiment, bus capabilities are grouped according to bus type. Each bus type is associated with a "bus capabilities structure" that defines the different attributes associated with a given I/O bus and I/O slot combination. The bus capabilities structures are bus type specific and are returned by the ACPI objects 240 and 250 for a given I/O slot supported by the I/O bus.

Table 2 describes the different bus types that are used in an exemplary computer system. Each of these bus types are associated with a bus capabilities structure that defines the bus capabilities of that particular bus type.

TABLE 2

| Bus Types | |
|---|---|
| Type | Description |
| 0x0 | Reserved |
| 0x1 | PCI |
| 0x2 | PCI-X |
| 0x3 | PCI-X 2.0 |
| 0x4 | PCI Express |
| 0x5 | AGP |
| 6+ | Reserved |

In one embodiment, new bus types are supported by the present invention. New bus types are given an entry to Table 1, and a corresponding bus capabilities structure that describes the different attributes associated with the new I/O bus is also created.

Table 3, Table 4, Table 5, Table 6 and Table 7 provide different bus capabilities structures for various bus types. Tables 3 through 7 are exemplary only, and embodiments of the present invention are well suited to a computer system that can support other bus types, more bus types, or less bus types. In one embodiment of the present invention, the bus capabilities structures detail various attributes that are called in a control method or as a data object as follows: a bus type description of a respective I/O bus from a plurality of bus types supported by the computer system; a length in bytes of that bus capabilities structure associated with the respective I/O bus; a list of frequency capabilities of the respective I/O bus; a list of power supported by the respective I/O bus; a list of voltages supported by the respective I/O bus; and a bandwidth of the respective I/O bus.

Table 3 provides an exemplary bus capabilities structure for a PCI bus.

TABLE 3

| PCI Bus | | | |
|---|---|---|---|
| Field | Byte length | Byte Offset | Description |
| Type | 2 | 0 | PCI (Type 0x1) |
| Length | 2 | 2 | The length of the structure, in bytes, including the type, starting from offset 0. This field is used to record the size of the entire structure. |
| Capabilities Field | 2 | 4 | Bit 0: 33 MHz<br>Bit 1: 66 MHz<br>Bit 2+: Reserved |
| Power | 1 | 6 | 0: 7.5 W<br>1: 15 W<br>2: 25 W<br>3+: Reserved |
| Voltage | 1 | 7 | Bit 0: 3.3 V<br>Bit 1: 5 V<br>Bit 2+: Reserved |
| Bandwidth | 4 | 8 | Bandwidth of the Bus in (MB) |

Table 4 provides an exemplary bus capabilities structure for a PCI-X bus.

TABLE 4

| | | PCI-X Bus | |
|---|---|---|---|
| Field | Byte length | Byte Offset | Description |
| Type | 2 | 0 | PCI-X (Type 0x2) |
| Length | 2 | 2 | The length of the structure, in bytes, including the type, starting from offset 0. This field is used to record the size of the entire structure. |
| Capabilities Field | 2 | 4 | Bit 0: 66 MHz<br>Bit 1: 100 MHz<br>Bit 2: 133 MHz<br>Bit 3+: Reserved |
| Power | 1 | 6 | 0: 7.5 W<br>1: 15 W<br>2: 25 W<br>3+: Reserved |
| Voltage | 1 | 7 | Bit 0: 3.3 V<br>Bit 1: 5 V<br>Bit 2+: Reserved |
| Bandwidth | 4 | 8 | Bandwidth of the Bus in (MB) |

Table 5 provides an exemplary bus capabilities structure for a PCI-X version 2.0 bus.

TABLE 5

| | | PCI-X 2.0 Bus | |
|---|---|---|---|
| Field | Byte length | Byte Offset | Description |
| Type | 2 | 0 | PCI-X 2.0 (Type 0x3) |
| Length | 2 | 2 | The length of the structure, in bytes, including the type, starting from offset 0. This field is used to record the size of the entire structure. |
| Capabilities Field | 2 | 4 | Bit 0: 266 MHz<br>Bit 1: 533 MHz<br>Bit 2+: Reserved |
| Power | 1 | 6 | 0: 7.5 W<br>1: 15 W<br>2: 25 W<br>3+: Reserved |
| Voltage | 1 | 7 | Bit 0: 3.3 V<br>Bit 1: 5 V<br>Bit 2+: Reserved |
| Bandwidth | 4 | 8 | Bandwidth of the Bus in (MB) |

Table 6 provides an exemplary bus capabilities structure for a PCI Express bus. This is used mainly by diagnostic tools or manageability tools to find out the I/O slot capability. The hot plug is done through standard PCI Express mechanism in hardware.

TABLE 6

| | | PCI Express Bus | |
|---|---|---|---|
| Field | Byte length | Byte Offset | Description |
| Type | 2 | 0 | PCI Express (Type 0x4) |
| Length | 2 | 2 | The length of the structure, in bytes, including the type, starting from offset 0. This field is used to record the size of the entire structure. |
| Capabilities Field | 2 | 4 | Bit 0: 2.5 GHz<br>Bit 1: 6.25 GHz (Next Generation)<br>Bit 2+: Reserved |
| Power | 1 | 6 | 0: 7.5 W<br>1: 15 W<br>2: 25 W<br>3: 50 W (*Under consideration)<br>4+: Reserved |
| Voltage | 1 | 7 | Bit 0: 3.3 V<br>Bit 1+: Reserved |
| Bandwidth | 4 | 8 | Bandwidth of the Bus in (MB) |
| Form Factor | 4 | 12 | Bit 0: GPIO Card<br>Bit 1: Graphics<br>Bit 2: Mini Card<br>Bit 3: NEWCARD<br>Bit 4: Server Module (*)<br>Bit 5: Advanced TCA (*)<br>Bit 6+: Reserved |
| Link | 4 | 16 | Bit 0: x1<br>Bit 1: x2<br>Bit 3: x4<br>Bit 4: x8<br>Bit 5: x12<br>Bit 6: x16<br>Bit 7: x32<br>Bit 8+: Reserved |

Table 7 provides an exemplary bus capabilities structure for an AGP bus.

TABLE 7

| | | AGP Bus | |
|---|---|---|---|
| Field | Byte length | Byte Offset | Description |
| Type | 2 | 0 | AGP (Type 0x5) |
| Length | 2 | 2 | The length of the structure, in bytes, including the type, starting from offset 0. This field is used to record the size of the entire structure. |
| Capabilities Field | 2 | 4 | Bit 0: 1x<br>Bit 1: 2x<br>Bit 2: 4x<br>Bit 3: 8x<br>Bit 4+: Reserved |
| Power | 1 | 6 | Bit 0: 50 W<br>Bit 1+: Reserved |
| Voltage | 1 | 7 | Bit 0: 0.8 V<br>Bit 1: 1.5 V<br>Bit 2: 3.3 V<br>Bit 3+: Reserved |
| Bandwidth | 4 | 8 | Bandwidth of the Bus in (MB) |

Figure 3:
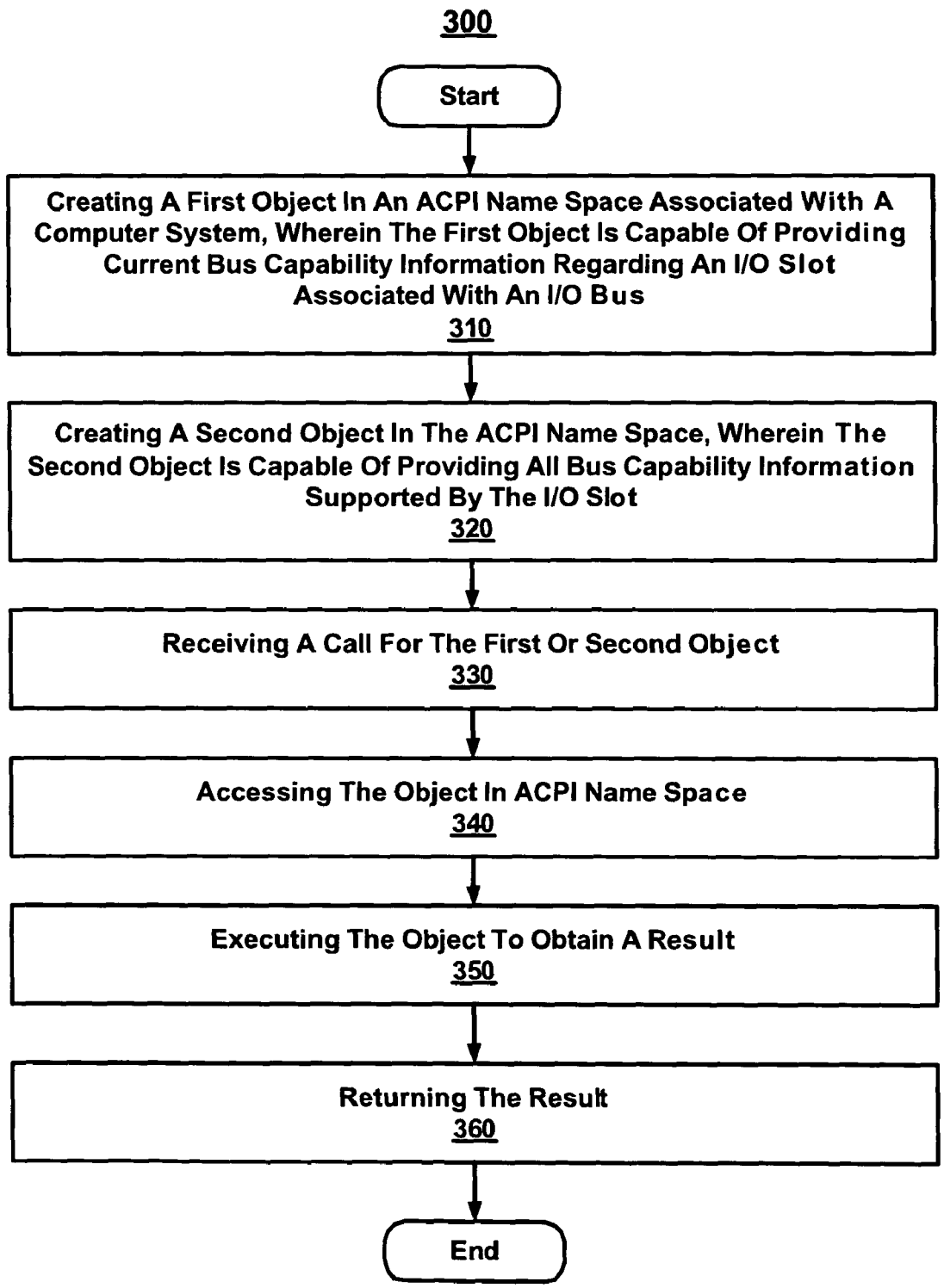
FIG. 3 is a flow diagram illustrating steps in a computer implemented method for providing bus capabilities information for an I/O bus in a computer system using ACPI, in accordance with one embodiment of the present invention.

The flow chart 300 in FIG. 3 illustrates steps in a computer implemented method for providing bus capabilities of an I/O bus in a computer system using ACPI, in accordance with one embodiment of the present invention. The present embodiment is able to provide the capabilities of different I/O slots available on a computer system. Without this interface provided by embodiments of the present invention, the OS and the utilities performing resource configuration management should have to hard code information specific to a platform that would require periodic software updates as new platforms release, which are not dynamically updated. Alternately, the OS would have to request firmware to support optional SMBIOS Type 9 entry or OEM-specific data structures, that still may not be dynamically updated. The present embodiment is capable of dynamically providing the capabilities of an I/O bus for use in configuration management without any software updates, as an example. For instance, the information provided is helpful during Hot-plug PCI or for maximum return on available bandwidth in a given system.

At 310, the present embodiment creates a first object in an ACPI name space. The ACPI name space is associated with a computer system. As discussed previously, the ACPI name space provides a layout of the hardware configuration in the computer system. In particular, the first object is capable of providing current bus capabilities information regarding an I/O slot associated with an I/O bus in the computer system.

At 320, the present embodiment creates a second object in the ACPI name space. In particular, the second object is capable of providing all the bus capability information supported by the I/O bus and I/O slot combination.

At 330, under the ACPI mechanism, the present embodiment receives a call for the first or second object. At 340, the present embodiment accesses the object that is called in the ACPI name space. For instance, the present embodiment accesses _BCP or _CBS in the ACPI name space.

At 350, the present embodiment executes the object that is called. For instance, if _BCP is called and executed, the present embodiment returns a list of all the bus capabilities of a respective I/O bus. On the other hand, if _CBS is called and executed, the present embodiment returns the current bus capabilities of the respective I/O bus.

At 360, the present embodiment returns the result of executing the object. For instance, the result is returned to an OS or utility that is using the bus capability information from the first and second object to perform resource configuration management.

For instance, in one embodiment the results are used for configuration management to determine if a device that is being added to an I/O slot is compatible with the capabilities of the I/O slot. If both the device and the I/O slot capabilities are matched, then the device is recognized and supported by the I/O bus. On the other hand, if the device and I/O slot capabilities do not match, then the resource configuration management invokes several other options.

For example, in one embodiment in the case the frequency mismatch, the present embodiment notifies the system managing power (e.g., OSPM) that a device inserted into an I/O slot cannot be coupled to the bus because the device cannot be operated at the current frequency of the I/O bus. This is the case if a user tried to ho-plug a 33 MHz PCI device into an I/O slot that was on an I/O bus running at greater than 33 MHz.

As another example, in the case of bus mode mismatch, the present embodiment notifies the system managing power (e.g., OSPM) that a device has been inserted in to a slot or bay that cannot support the device in its current mode of operation. This is the case if a user tried to hot-plug a PCI devices into an I/O slot that was running in PCI-X mode.

As described previously, embodiments of the present invention are capable of supporting new bus types. For instance, to support a new bus type, the new bus type is added to a list of bus types recognized by the computer system. The new bus type is associated with a new I/O slot that is associated with a new I/O bus supported by the computer system. Correspondingly, a new bus capabilities structure is also provided for the new bus type. The new bus capabilities structure describe the capabilities of the new bus type and is returned when executing objects associated with the new I/O bus.

While the method of the embodiment illustrated in flow chart 300 shows specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The preferred embodiment of the present invention, a method and system for providing bus capabilities of an I/O bus in a computer system using ACPI, is thus described. While the present invention has been described in particular embodiments, it should be appreciated that the present invention should not be construed as limited by such embodiments, but rather construed according to the below claims.

What is claimed is:

1. A non-transitory computer readable storage medium having computer readable program code embodied therein for discovering I/O bus capabilities on a computer system via ACPI, comprising:
   an ACPI name space stored on said computer readable storage medium, said ACPI name space detailing hardware configuration in said computer system;
   a first ACPI interface in said ACPI name space stored on said computer readable storage medium, said first ACPI interface detailing current capabilities of an I/O bus communicatively coupled to an I/O slot; and
   a second ACPI interface stored on said computer readable storage medium, said second ACPI interface detailing a list of capabilities of said I/O bus that supports said I/O slot.

2. The non-transitory computer readable storage medium of claim 1, wherein said first ACPI interface and said second ACPI interface comprise objects in said ACPI name space.

3. The non-transitory computer readable storage medium of claim 2, wherein said objects in said ACPI name space are 4-byte aligned.

4. The non-transitory computer readable storage medium of claim 1, further comprising:
   a stored list of a plurality of bus types recognized by said system.

5. The non-transitory computer readable storage medium of claim 4, further comprising:
   a plurality of bus structures one of which is returned by said first ACPI interface and at least one of which is returned by said second ACPI interface, wherein each of said plurality of bus structures is associated with one of said plurality of bus types detailing bus capabilities for that I/O bus.

6. The non-transitory computer readable storage medium of claim 5, wherein each of said plurality of bus structures for respective I/O buses comprises:
   a bus type description of a respective I/O bus from said plurality of bus types;
   a length in bytes of that bus structure associated with said respective I/O bus;
   a list of frequency capabilities of said respective I/O bus;
   a list of powers supported by said respective I/O bus;
   a list of voltages supported by said respective I/O bus; and
   a bandwidth of said respective I/O bus.

7. The non-transitory computer readable storage medium of claim 1, wherein said first ACPI interface is configured to call a method for dynamically discovering current capabilities of said I/O bus.

8. The non-transitory computer readable storage medium of claim 1, wherein said bus is selected from a group consisting of the following:
   a PCI bus;
   a PCI-X bus;
   an AGP bus; and
   a PCI Express bus.

9. A computer-implemented method for providing I/O bus capabilities on a computer system via ACPI, comprising:
   at said computer system, creating a first object in an ACPI name space associated with said computer system, wherein said first object provides current bus capability information regarding an I/O bus supporting an I/O slot;
   at said computer system, storing said first object in an ACPI table residing in a non-transitory computer-readable storage medium of said computer system;
   at said computer system, creating a second object in said ACPI name space, wherein said second object provides bus capability information of said I/O bus that supports said I/O slot; and
   at said computer system, storing said second object in said ACPI table residing in said non-transitory computer-readable storage medium.

10. The method of claim 9, further comprising:
    receiving a call for said first object;
    accessing said first object in said ACPI name space;
    executing said first object to obtain a result; and
    returning said result.

11. The method of claim 9, further comprising:
    receiving a call for said second object;
    accessing said second object in said ACPI name space;
    executing said second object to obtain a result; and
    returning said result.

12. The method of claim 9, further comprising:
    performing resource configuration management using bus capability information from said first object and said second object.

13. The method of claim 9, further comprising:
    dynamically discovering attributes of said current bus capabilities by executing said first object.

14. The method of claim 9, wherein at least one of said first and second objects returns a constant for said bus capabilities of said I/O slot.

15. The method of claim 9, further comprising:
    adding a new bus type into a list of bus types recognized by said system, wherein said new bus type is associated with a new I/O slot associated with a new I/O bus supported by said computer system; and
    providing a new bus structure detailing bus capabilities for said new bus type, wherein said new bus structure is returned when executing objects associated with said new I/O bus.

16. A computer system comprising:
    a processor;
    a bus coupled to said processor; and
    a non-transitory computer readable storage medium coupled to said bus, non-transitory computer readable storage medium having computer readable program code embodied therein for causing a computer system to perform a method for providing I/O bus capabilities on said computer system via ACPI, said method comprising:
       creating a first object in an ACPI name space associated with said computer system, wherein said first object provides current bus capability information regarding an I/O bus supporting an I/O slot;
       storing said first object in an ACPI table residing in a non-transitory computer-readable storage medium of said computer system;
       creating a second object in said ACPI name space, wherein said second object provides bus capability information supported by said I/O bus; and
       storing said second object in said ACPI table residing in said non-transitory computer-readable storage medium.

17. The computer system of claim 16, wherein said method further comprises:
    receiving a call for said first object;
    accessing said first object in said ACPI name space;
    executing said first object to obtain a result; and
    returning said result.

18. The computer system of claim 16, wherein said method further comprises:
    receiving a call for said second object;
    accessing said second object in said ACPI name space;
    executing said second object to obtain a result; and
    returning said result.

19. The computer system of claim 16, wherein said method further comprises:
    performing configuration management using bus capability information from said first object and said second object.

20. The computer system of claim 16, wherein said method further comprises:
    dynamically discovering attributes of said current bus capabilities by executing said first object.

21. The computer system of claim 16, wherein at least one of said first and second objects returns a constant for said bus capabilities of said I/O bus.

22. The computer system of claim 16, wherein said method further comprises:
    adding a new bus type into a list of bus types recognized by said system, wherein said new bus type is associated with a new I/O slot associated with a new I/O bus supported by said computer system; and
    providing a new bus structure detailing bus capabilities for said new bus type, wherein said new bus structure is returned when executing objects associated with said new I/O bus.

23. A non-transitory computer readable storage medium having computer readable program code embodied therein for causing a computer system to perform a method for providing I/O bus capabilities on a computer system, said method comprising:
    creating a first object in an ACPI name space associated with said computer system, wherein said first object provides current bus capability information regarding an I/O bus supporting an I/O slot;
    storing said first object in an ACPI table residing in a non-transitory computer-readable storage medium of said computer system;
    creating a second object in said ACPI name space, wherein said second object provides bus capability information supported by said I/O bus; and
    storing said second object in said ACPI table residing in said non-transitory computer-readable storage medium.

24. The non-transitory computer readable storage medium of claim 23, wherein said method further comprises:
    receive a call for said first object;
    access said first object in said ACPI name space;
    execute said first object to obtain a result; and
    return said result.

25. The non-transitory computer readable storage medium of claim 23, wherein said method further comprises:
    receive a call for said second object;
    access said second object in said ACPI name space;
    execute said second object to obtain a result; and
    return said result.

* * * * *

UNITED STATES PATENT AND TRADEMARK OFFICE
CERTIFICATE OF CORRECTION

PATENT NO. : 7,953,900 B2
APPLICATION NO. : 10/969756
DATED : May 31, 2011
INVENTOR(S) : Shiraz A. Qureshi Page 1 of 1

It is certified that error appears in the above-identified patent and that said Letters Patent is hereby corrected as shown below:

In column 3, line 27, delete "Computer includes" and insert -- Computer system 100 includes --, therefor.

In column 3, line 56, delete "the to" and insert -- the system 100 to --, therefor.

In column 3, line 62, delete "computer to" and insert -- computer system 100 to --, therefor.

Signed and Sealed this
Twentieth Day of December, 2011

David J. Kappos
*Director of the United States Patent and Trademark Office*